United States Patent [19]

Hoban et al.

[11] 3,957,294
[45] May 18, 1976

[54] ROTARY GAS JOINT

[75] Inventors: Fay A. Hoban, China Lake; Edwin M. Allen, Ridgecrest, both of Calif.

[73] Assignee: The United States of America as represented by the Secretary of the Navy, Washington, D.C.

[22] Filed: June 6, 1974

[21] Appl. No.: 476,958

[52] U.S. Cl. .................................. 285/276; 285/14
[51] Int. Cl.² ........................................ F16L 27/00
[58] Field of Search ............... 285/11, 14, 276, 272, 285/275, 277, 280, 278, 279, 281; 277/13, 15, 135

[56] References Cited
UNITED STATES PATENTS
2,424,924 10/1947 Fisher ............................ 285/276 X
3,129,960 4/1964 Suhrodt .......................... 285/275 X FOREIGN PATENTS OR APPLICATIONS
1,054,397 4/1959 Germany ............................ 285/275

*Primary Examiner*—Dave W. Arola

[57] ABSTRACT

A device for transmitting high pressure fluid between relatively rotating members. One of the members is equipped with a protruding axial cylindrical pipe having an accurately machined outside diameter and the other member has an accurately machined central bore receiving said pipe. By careful positioning and dimensioning of parts the pipe of the one member rotates in the bore of the other member without friction and with negligible loss of fluid.

1 Claim, 1 Drawing Figure

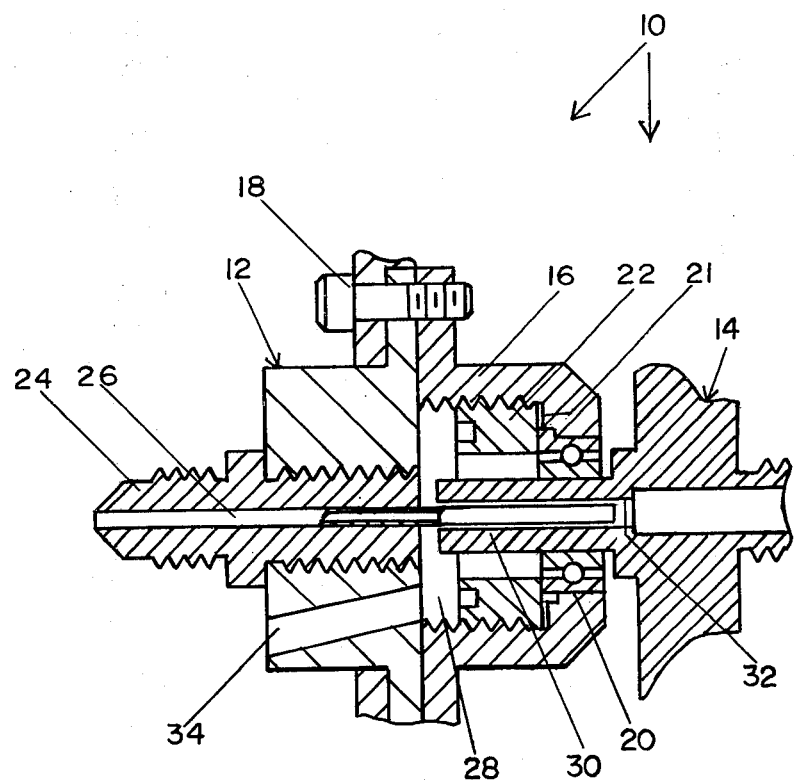

ROTARY GAS JOINT

BACKGROUND OF THE INVENTION

The present invention relates to means for transmitting high pressure fluids between relatively rotating parts.

More particularly the invention relates to a device for passing high pressure gases through a bearing joint from a stationary member to a rotating member.

The device as described and illustrated is particularly adapted to supply high pressure gas from a missile body to a rotating seeker head with minimum interference with bearing movement and with minimum leakage in the joint.

Prior art attempts to pass fluids through bearing joints have generally relied upon various seals and labyrinths to prevent leakage. These prior art devices, however, have by their construction invariably suffered from increased joint friction torque with increasing pressure.

According to the present invention a rotary gas joint is provided which eliminates any contacting surfaces or seals and transmits gases under high pressures with essentially zero joint friction torque. Flow losses are minimized by maintaining a close fit between the rotating element and the stationary gas delivering member.

BRIEF DESCRIPTION OF THE DRAWING

The single FIGURE of th drawing is a longitudinal cross sectional view through the rotational axis of a bearing joint incorporating a practical embodiment of the invention.

DESCRIPTION AND OPERATION

Designated generally by the numeral 10 on the drawing is a typical bearing configuration, for example, between a stationary member 12 and rotating member 14. A bearing housing 16 is shown fastened to stationary member 12 by means of screws 18. A bearing 20 is positioned in a central bore of housing 16 and maintained in place by a shoulder 21 on the outer race of the bearing and by a threaded bearing retainer 22 in a well known manner.

Centrally located in a threaded bore in stationary member 12 is a high pressure input fitting 24. Also centrally located in fitting 24 and integrally fastened thereto is a pipe 26 which extends from the fitting into a chamber 28 within bearing housing 16.

Rotating member 14 is provided with an axial cylindrical transfer spindle 30 received by the inner race of bearing 20 and extending into the chamber 28 in bearing housing 16. The inner bore 32 of spindle 30 is accurately machined to receive pipe 26 without friction but close enough to prevent undesirable loss of fluid.

A typical installation for test purposes was manufactured with pipe 26 having an OD of $$.0635 \begin{array}{l} +.0002 \\ -.0000 \end{array}$$

and spindle bore 32 having an ID of $$.0640 \begin{array}{l} +.0000 \\ -.0001 \end{array}$$

both measurements being in inches. The length of the coupling joint was such that the pipe 26 entered the bore of spindle 30 by about 0.625 inch and empirically it is indicated that penetration by pipe 26 in bore 32 a distance of eight to twelve pipe 26 outside diameters is optimum.

The materials used in test models have been metals. The pipe 26 and spindle 30, for example, were of 316 stainless steel. No reason is seen, however, why these parts could be manufactured from other materials including plastics.

As a precautionary measure, to prevent pressure buildup within chamber 28 in bearing housing 16, a vent 34 has been drilled in stationary member 12. Tests, have indicated, however, that this precaution was unnecessary in the units under test using nitrogen gas at 3000 psi.

The small amount of leakage between pipe 26 and bore 32 of spindle 30 is in no way detrimental to the operation of the device and, in fact, may form an air bearing between the two mating surfaces.

What is claimed is:

1. In a conduit for passing gas along the axis of rotation between two relatively revolvable members, the combination comprising:
    a spindle having an inner centrally located bore, and said spindle being fixedly and rigidly secured to one of said revolvable members;
    a cylindrical pipe fixedly and rigidly secured to the other said revolvable member;
    said pipe entering said spindle bore, and coaxially and coextensively occupying said bore a distance within the range of from eight to twelve pipe outside diameters;
    said spindle bore inside diameter and said pipe outside diameter being selected to produce a diametral clearance within the range of from 0.0002 inch to 0.0005 inch between the outside surface of said pipe and the bore surface of said spindle over said coextensive length;
    and means for maintaining said pipe in concentric, coaxial alignment with said spindle bore for preventing frictional torque caused by said pipe outside surface contacting said spindle bore surface while said revolvable members are rotating relative to one another.

* * * * *